United States Patent [19]
Bodeep et al.

[11] Patent Number: 5,822,102
[45] Date of Patent: Oct. 13, 1998

[54] PASSIVE OPTICAL NETWORK EMPLOYING UPCONVERTED 16-CAP SIGNALS

[75] Inventors: George E. Bodeep, Lawrenceville, Ga.; Thomas Edward Darcie, Middletown; Sheryl Leigh Woodward, Holmdel, both of N.J.

[73] Assignee: AT&T Corp, Middletown, N.J.

[21] Appl. No.: 752,115

[22] Filed: Nov. 20, 1996

[51] Int. Cl.$^6$ .................................................. H04B 10/00
[52] U.S. Cl. ........................ 359/167; 359/125; 359/191
[58] Field of Search ........................... 359/125, 132–133, 359/157, 167–168, 190–191; 345/7, 10–12

[56] References Cited

U.S. PATENT DOCUMENTS

| | | | |
|---|---|---|---|
| 4,868,894 | 9/1989 | Gilder et al. | 319/191 |
| 4,924,492 | 5/1990 | Gitlin et al. | 379/93 |
| 5,023,950 | 6/1991 | Tsushima et al. | 359/191 |
| 5,247,347 | 9/1993 | Litteral et al. | 358/85 |
| 5,329,308 | 7/1994 | Binns et al. | 348/14 |
| 5,339,315 | 8/1994 | Maeda et al. | 370/85.1 |
| 5,343,240 | 8/1994 | Cheng | 385/14 |
| 5,410,343 | 4/1995 | Coddington et al. | 348/7 |
| 5,457,560 | 10/1995 | Sharpe et al. | 359/137 |
| 5,508,732 | 4/1996 | Bottomley et al. | 348/7 |
| 5,517,232 | 5/1996 | Heidemann et al. | 348/7 |
| 5,550,577 | 8/1996 | Verbiest et al. | 348/7 |

OTHER PUBLICATIONS

Woodward et al., "A Passive–optical Netwrok Employing upon verted 16–cap Signals", IEEE Photonics Technology Letters, vol. 8, No. 9, Sep. 1996. pp. 1249–1251.

Jones, D. "Signal Processing Design for an ADSL High Speed Equalizer", IEEE (Conference Paper), 1994.

Im, G.H. et al., "51.84 Mb/s 16–CAP ATM LAN Standard", *IEEE Journal on Slected Areas in Communications*, May 1995, vol. 995, vol. 13, No. 4, pp. 620–632.

Harman, D.D. et al., "Local Distribution for Interactive Multimedia TV of the Home", First International Workshop on Community Networking, Jul. 1994, pp. 175–182.

Darcie, T.E. et al., "Lightwave System Using Microwave Subcarrier Multiplexing", *Electronics Letters*, Jul. 17, 1986, vol. 22, No. 15, pp. 774–775.

Wood, T.H. et al., "Operation of a Passive Optical Network with Subcarrier Multiplexing in the Prescnce of Optical Beat Interference", *J. Lightwave Technol.*, Oct. 1993, vol. LT–11, No. 10, pp. 1632–1640.

Woodward, S.L. et al., "Reduction of Optical–Beat Interference in Subcarrier Networks", IEEE *Photonics Technology Letters*, vol. 8, No. 5, May 1996, pp. 695–696.

Reichmann, K.C. et al., "Broadcast Digital Video as a Low–Cost Overlay to Baseband Digital Switched Services on a PON", *Optical Fiber Communications Conference*, 1996, W14, pp. 144–145.

Lu, X. et al., "Clipping Induced Impulse Noise and Its Effect on Bit–Error Performance in AM–VSB/64QAM Hybrid Lightwave Systems", *IEEE Photonics Technology Letters*, Jul. 1994, Vol. 6, pp. 866–868.

Jones, J. Richard, "Video Services Delivery in Fiber in the Loop Ststem Using MPEG Encoding and ATM Transport", *IEEE Lasers and Electro–Optics Soc.*, Nov. 15–18, 1993, pp. 122–123.

Kotelly, George, "Bell Atlantic certifies switched–digital video", *Lightwave*, Sep. 1996, pp. 1, 23, 24.

*Primary Examiner*—Kinfe-Michael Negash

[57] ABSTRACT

At a central facility, information for a user is converted to a carrierless AM/PM (CAP) signal, upconverted, combined with other upconverted signals destined for other users and transmitted via an analog optical fiber optic line to an optical network unit (ONU) which downconverts the CAP signals without changing their modulation format and places them on the appropriate unshielded twisted line pairs for respective users. If the user is able to receive the optical fiber directly, the ONU can be eliminated. Information may also be transmitted from the users to the central facility using the same transmission lines. Additionally, voiceband channels may be carried on the same transmission lines.

42 Claims, 3 Drawing Sheets

PASSIVE OPTICAL NETWORK EMPLOYING UPCONVERTED 16-CAP SIGNALS

This application claims the benefit of U.S. Provisional application Ser. No. 60/021,440, filed Jul. 10, 1996.

BACKGROUND OF THE INVENTION

The present invention relates to transmission of data from a central facility to users, and, more particularly, is directed to providing digital information as a carrierless AM/PM signal at the central facility and using fiber optic and twisted pair communication lines between the central facility and the users.

In a passive optical network (PON), a central facility is connected by fiber optic communication lines to a plurality of optical network units (ONUs) located outside user premises, typically at a curbside pedestal. An ONU typically includes electronics for receiving the signals transmitted on the fiber optic lines, converting the signal in some manner, and then transmitting the converted signals to the users served by the ONU, typically via a twisted copper line pair or a coaxial cable. At the user premises, additional electronics receive the signals from the ONU and perform appropriate processing.

Transmission over an unshielded twisted line pair at a data rate of 51.84 Mbps downstream (from the central facility to the user) and 1.62 Mbps upstream (from the user to the central facility) has been demonstrated, as explained in Harman et al., "Local Distribution for Interactive Multimedia TV to the Home", First International Workshop on Community Networking, July 1994, pp 175–182. This demonstration used carrier less AM/PM (CAP) transceivers, with a 16 point constellation (4 bits/symbol), hereinafter referred to as "16-CAP", to deliver the downstream signals, and quadrature-phase-shift keying (QPSK) for the upstream signals. The 16-CAP signal format is the current standard of the asynchronous transfer mode (ATM) forum for local area network (LAN) transmission at 51.84 Mbps.

In a system for transmitting switched digital video on CATV architecture systems proposed by Lucent Technologies and Broadband Technologies, baseband digital signals are transmitted to the ONU and described in Jones, "Video Services Delivery in Fiber in the Loop Systems Using MPEG Encoding and ATM Transport", *IEEE Lasers and Electro-Optics Society*, Nov. 15–18, 1993, pp 122–123. At the ONU the signals are demultiplexed, and converted from baseband to 16-CAP format. A drawback of this system is that the ONU is fairly complex, because it must convert from baseband to 16-CAP format.

Darcie et al., "Lightwave System using Microwave Subcarrier Multiplexing", *Electronics Letters*, Jul. 17, 1996, vol. 22, no. 15, pp 774–775, describe modulating (ASK, PSK or FSK) a microwave subcarrier with data from a plurality of channels, and then using the microwave subcarrier to intensity modulate an optical carrier. A drawback of using this scheme with a PON is that it is difficult, if not impossible, to transmit over 30 Mbps from a curbside ONU to the home over a twisted copper line pair using an ASK, PSK or FSK modulation format.

SUMMARY OF THE INVENTION

In accordance with an aspect of this invention, a method of and a system are provided for transmitting information from a central facility to a plurality of users in which CAP signals are provided for selected users, upconverted, combined and transmitted from the central facility to the selected users.

In accordance with another aspect of this invention, a method of, and a system for, transmitting information from a central facility to a plurality of users are provided, in which signals modulated in a predetermined format for selected users are upconverted, combined and transmitted from the central facility to an intermediate unit. At the intermediate unit, the combined upconverted signals are separated, downconverted and transmitted to the selected users in the predetermined modulation format. The transmission path to the selected users can be unshielded twisted line pairs, coaxial cable or fiber-optic links.

In accordance with a further aspect of this invention, information may also be transmitted from the users to the central facility using the same transmission lines. Additionally, voiceband channels may be carried on the same transmission lines.

In accordance with another aspect of this invention, an optical network unit is provided which comprises a receiver for receiving a lightwave signal and converting the lightwave signal to an electrical signal, and a downconverter for downconverting the electrical signal to a signal in a predetermined modulation format. The optical network unit delivers the signal in the predetermined modulation format to a user without modification of the modulation format.

It is not intended that the invention be summarized here in its entirety. Rather, further features, aspects and advantages of the invention are set forth in or are apparent from the following description and drawings.

DETAILED DESCRIPTION OF THE PREFERRED EMBODIMENTS

According to the present technique, information for a user is converted to a CAP signal at a central facility, then upconverted, combined with other upconverted signals destined for other users and transmitted via an analog optical fiber optic line to an ONU. The ONU downconverts the CAP signals without changing their modulation format and places them on the appropriate twisted line pairs for respective users.

An advantage of this technique is reducing the complexity in the ONU, which reduces its cost, as the ONU does not perform baseband to CAP signal format conversion. A further advantage of this technique is that it reduces the power consumed by the ONU.

Another advantage of this technique is that the data rate for individual users can be altered by modifying the equipment at the central facility and the user's premises, without need to alter the ONU or modify the data rate for other users served by the ONU.

In another embodiment of the present technique, a user is able to receive the optical fiber directly, so provision of an ONU at a location intermediate the central facility and user can be eliminated.

Figure 1:
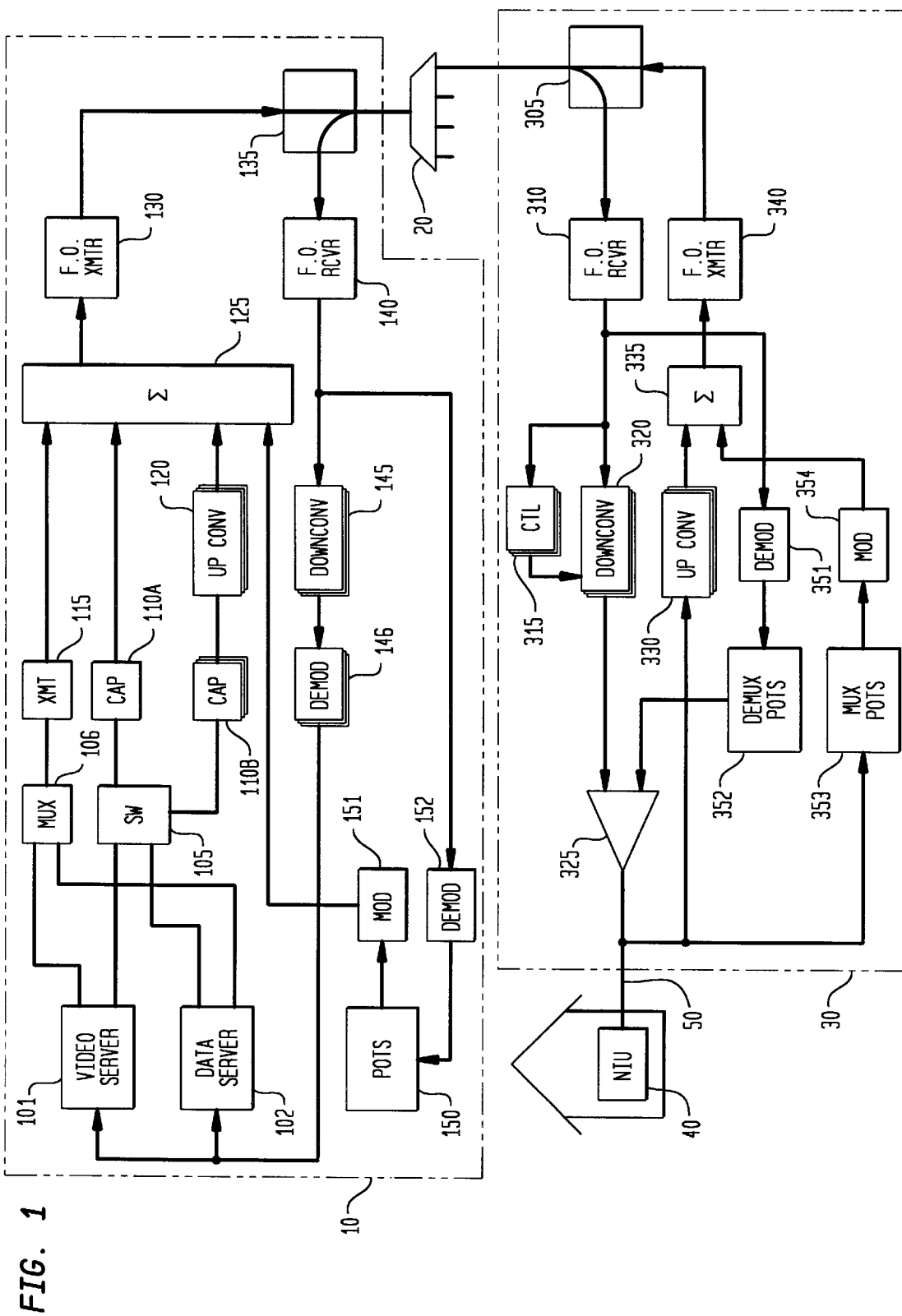
FIG. 1 is a block diagram illustrating application of the present invention.

FIG. 1 illustrates an environment in which the present technique is applied. In FIG. 1, central office 10 is coupled to fiber optic cable distribution plant 20, which is in turn coupled to ONU 30. It will be appreciated that actually there are many ONU 30s in the system of FIG. 1, but only one is shown for clarity. ONU 30 is coupled by unshielded twisted line pair 50 to network interface unit (NIU) 40 located in a user's home. It will be further appreciated that each ONU 30 is coupled to a plurality of homes, each having a respective NIU 40, but only one is shown for clarity. Each NIU 40 is operable to receive 51.84 Mbps of switched data from central office 10 modulated as a 16-CAP signal, and to transmit 1.62 Mbps to central office 10 modulated as a QPSK signal. A 51.84 Mbps downstream data rate facilitates delivery of approximately ten MPEG channels to each NIU 40.

The downstream data path will now be described.

Located at central office 10 are video server 101 and data server 102, which are coupled to switch 105 which is in turn coupled to CAP transmitters 110A, 110B. CAP transmitter 110A is coupled to summer 125, that is, its output is not upconverted, while CAP transmitter 110B is coupled through upconverter 120 to summer 125. Summer 125 is alternatively referred to as a combiner. It will be appreciated that additional CAP transmitters, sometimes referred to as CAP modulators, and corresponding upconverters may be present, but these are not shown for clarity. Summer 125 is coupled to fiber optic transmitter 130, which is in turn coupled to coupler 135, and thence to fiber optic cable distribution plant 20.

Located at ONU 30 is coupler 305 which is coupled to fiber optic receiver 310 which is in turn coupled to downconverter 320. It will be appreciated that additional downconverters may be present, but only one is shown for clarity. Downconverter 320 is coupled to amplifier 325, which is coupled via unshielded twisted line pair 50 to NIU 40. It will be appreciated that a respective amplifier 325 is provided for each NIU 40.

In operation, video server 101 and data server 102 each function to provide a data signal to switch 105, which is adapted to switch the signals provided thereto to respective ones of its output ports in accordance with control signals (not shown) from video server 101 and data server 102. The output ports of switch 105 respectively supply the switched signals to CAP transmitters 110A, 110B. CAP transmitter 110A operates at a data rate which is independent of the data rate of CAP transmitter 110B.

As explained in Im et al., "51.84 Mb/s 16-CAP ATM LAN Standard", *IEEE J. Sel. Areas in Comm.*, May 1995, vol. 13, no. 4, pp 620–632, CAP is a two dimensional passband transmission scheme. The bits to be transmitted are scrambled and supplied to an encoder which maps blocks of m bits into one of $k=2^m$ different complex symbols $A_n=a_n+jb_n$. After the encoder, the symbols $a_n$ and $b_n$ are supplied to digital shaping filters. The outputs of the filters are subtracted and the result is passed through a digital to analog converter followed by an interpolating low pass filter.

Figure 2A:
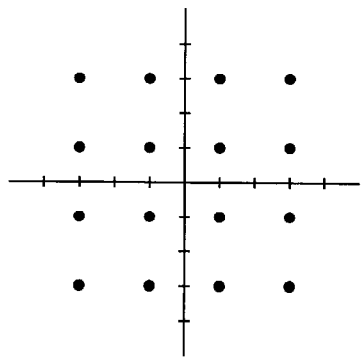
FIGS. 2A–2C illustrate CAP signal constellations.

The two dimensional display of the discrete values assumed by the symbols $a_n$ and $b_n$ is called a signal constellation. FIG. 2A shows a signal constellation employed when CAP transmitter 110A or 110B is a 16-CAP transmitter which can accommodate a 51.84 Mb/s data rate. CAP transmitters 110A, 110B use twice the bandwidth theoretically necessary to transmit 51.84 Mb/s, that is, they use 25.92 MHz rather than 12.96 MHz, so that CAP transmitters 110A, 110B incorporate adaptive equalization to combat cross-talk present in unshielded twisted pair 50. The outputs of CAP transmitters 110A, 110B are signals occupying a frequency spectrum of 6.48 MHz to 25.92 MHz.

Figure 2B:
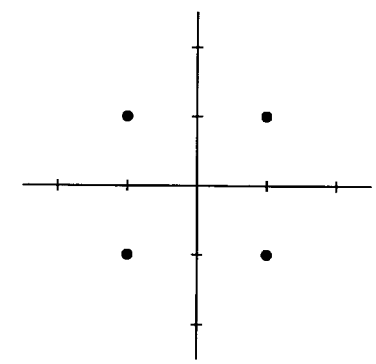
Figure 2C:
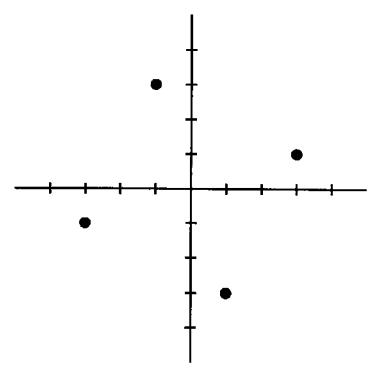

If a user requires a data rate less than provided by 16-CAP, a different transmission format, such as 4-CAP may be employed. FIGS. 2B and 2C show signal constellations which may be employed for 4-CAP transmission.

Figure 3A:
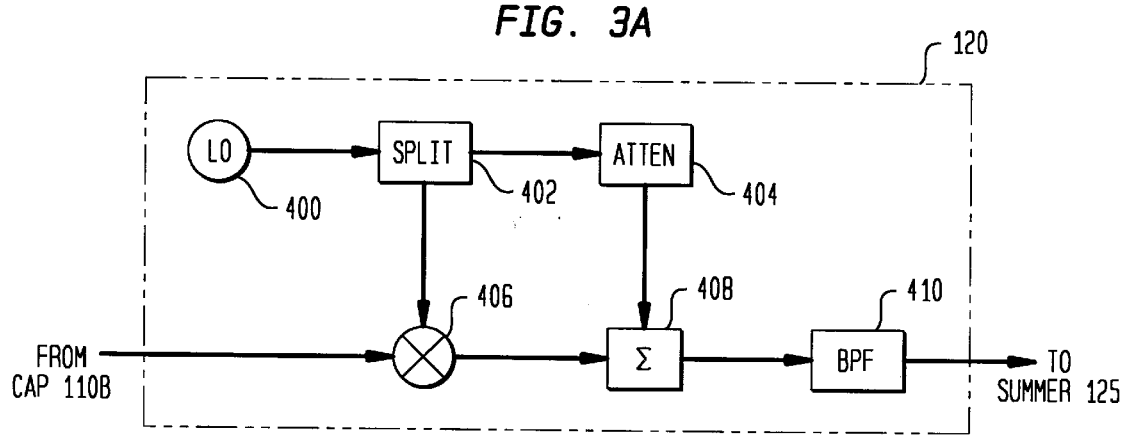
FIG. 3A is a block diagram of upconverter 120 of FIG. 1.

FIG. 3A is a block diagram of upconverter 120. Upconverter 120 includes local oscillator 400, splitter 402, attenuator 404, mixer 406, summer 408 and bandpass filter 410. Local oscillator 400 provides a signal to splitter 402 which is adapted to split the local oscillator output and to deliver the local oscillator signal to attenuator 404 and to mixer 406. The signal from CAP transmitter 110B is supplied to mixer 406 which functions to upconvert it by mixing it with the output of local oscillator 400, supplied thereto by splitter 402. To simplify downconversion, the local oscillator output is attenuated by attenuator 404 and added to the upconverted CAP signal at summer 408. Transmitting the local oscillator signal with the upconverted CAP signal does not degrade the upconverted CAP signal because the upconverted CAP signal is a passband signal lacking a DC component. The output of summer 408 is applied to bandpass filter 410 which functions to filter the summed signal using a 35 MHz bandpass filter centered 17.5 MHz above the local oscillator frequency, so that only one sideband of the upconverted signal is used, thereby improving the bandwidth efficiency. The bandpass filtered signal is supplied to summer 125 of FIG. 1.

Summer 125 combines the CAP signals, as selectively upconverted by upconverter 120, and supplies them to fiber optic transmitter 130 which is adapted to convert electrical signals to lightwave signals for distribution to users via fiber optic cable distribution plant 20. The upconverted signals occupy a frequency band extending to, for example, 800 MHz. It will be appreciated that upconversion comprises frequency shifting the carrier frequency of the signal, and that combining upconverted signals comprises subcarrier multiplexing. Fiber optic transmitter 130 may be a laser producing a light signal having a wavelength of 1.3 μm. Thus, it is seen that a plurality of channels of upconverted CAP signals, some or all of which may be 16-CAP signals, are subcarrier multiplexed.

Figure 4A:
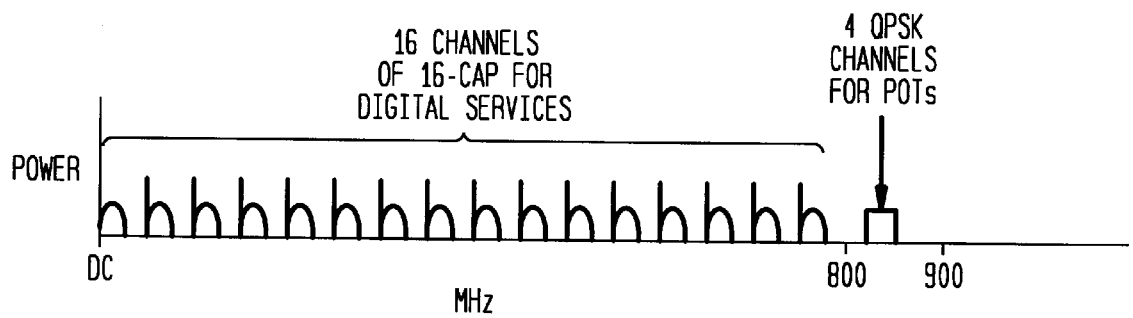
FIG. 4A is a chart showing the downstream channel bandwidth allocation on the optical fiber.

FIG. 4A shows the downstream channel bandwidth allocation on the optical fiber. Sixteen signals, each of which may be a 16-CAP signal, are simultaneously transmitted in the RF spectrum from 6 MHz to 800 MHz. The local oscillator frequencies used for different 16-CAP signals are separated by 50 MHz spacing to provide an adequate guard band between channels with reasonable filtering. The signal occupying the lowest frequency band need not be upconverted. It will be appreciated that each of the fifteen upconverted signals has a spike at the local oscillator frequency and a hump shape representing the 16-CAP signal, resulting in an "h" shape for each upconverted signal. Also, four QPSK channels occupy a frequency band between 800 and 900 MHz, for plain old telephone service, discussed below.

At ONU 30, fiber optic receiver 310 functions to convert the signals supplied thereto from lightwave form to electrical form, and to supply the electrical signals to downconverter 320. In its simplest form, downconverter 320 is adapted to separate (extract) a CAP signal at a predetermined subcarrier frequency and to downconvert the signal.

Figure 3B:
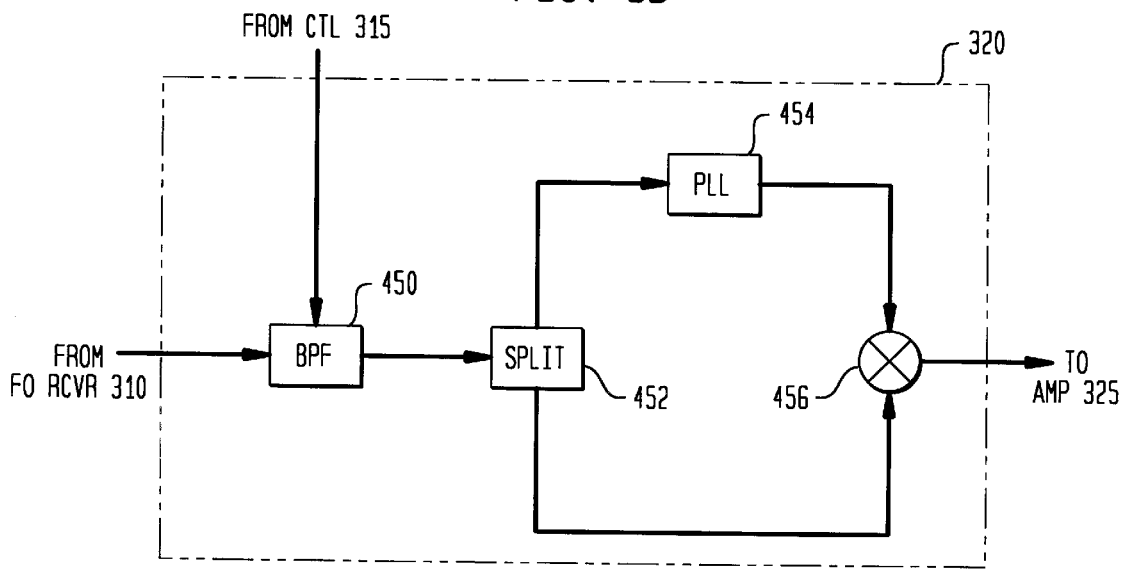
FIG. 3B is a block diagram of downconverter 320 of FIG. 1.

FIG. 3B is a block diagram of downconverter 320. Downconverter 320 includes frequency controllable bandpass filter (FC-BPF) 450, splitter 452, phase locked loop (PLL) 454 and mixer 456. FC-BPF 450 is operable to select the desired channel from the signal supplied thereto by fiber optic receiver 310, specifically, to filter the signal using a 35 MHZ wide filter having a center frequency selectable in accordance with a control signal supplied thereto from controller 315, described below. The filtered signal is supplied to splitter 452 which functions to split the filtered signal and apply it to both PLL 454 and mixer 456. PLL 454 is adapted to extract the local oscillator from the signal supplied thereto, and to apply the local oscillator to mixer 456. Mixer 456 serves to downconvert the CAP signal supplied thereto from splitter 452 to its original frequency band using the local oscillator signal from PLL 454, and the apply the downconverted signal to amplifier 325 of FIG. 1. Amplifier 325 functions to amplify the CAP signal and transmit it to NIU 40.

At NIU 40, electronics are provided to receive the CAP signal and recover the original bit stream, in a corresponding manner to the transmission path described above. NIU 40 also includes appropriate data processing capability, such as an MPEG decoder for video, and interfaces to appropriate user equipment, such as a television set, personal computer, facsimile machine, telephone and so on.

The upstream data path will now be described. Examples of data transmitted upstream include a video program selection, and a response to data transmitted downstream.

NIU 40 provides a 1.62 Mbps user data signal modulated in a signalling format such as QPSK in a frequency band of 28–30 MHz via unshielded twisted line pair 50 which is used for downstream data to ONU 30. In other embodiments, a separate unshielded twisted line pair is used for upstream transmission. The user data signal is supplied to upconverter 330 which functions to upconvert the user data signal. It will be appreciated that signals from different users are upconverted to different frequencies and supplied to summer 335 which combines the upconverted user data signals and supplies the combined upconverted signals to fiber optic transmitter 340. Upconverting the user data signals to approximately 1 GHz places them in a frequency band above the downstream signal frequency band, which substantially eliminates RF crosstalk problems. Fiber optic transmitter 340 is adapted to convert electrical signals to lightwave signals for delivery to central office 10 via fiber optic cable distribution plant 20. The fiber optic signal produced by fiber optic transmitter 340 is coupled to the fiber optic distribution plant 20 by coupler 305. Fiber optic transmitter 340 may be an inexpensive laser producing a light signal having a wavelength of 1.55 μm.

Figure 4B:
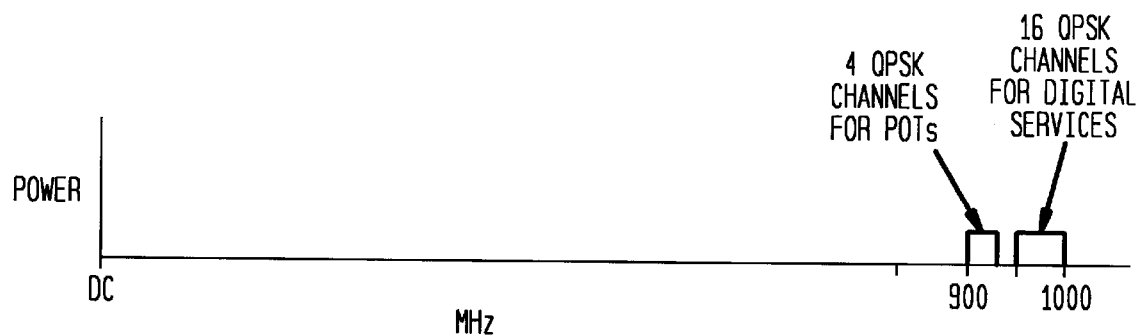
FIG. 4B is a chart showing the upstream channel bandwidth allocation on the optical fiber.
Figure 4C:
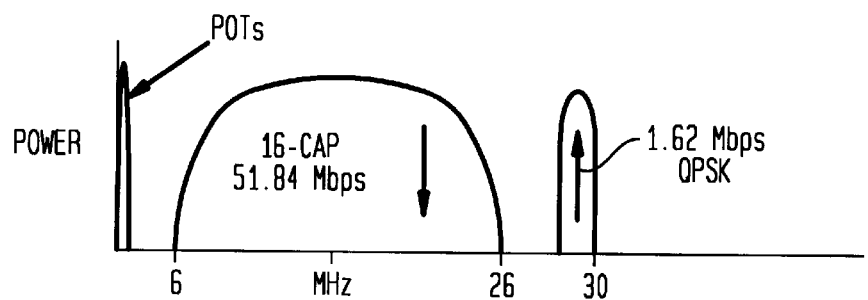
FIG. 4C is a chart showing the bandwidth usage on unshielded twisted line pair 50 in the downstream and upstream directions.

FIG. 4B shows the upstream channel bandwidth allocation on the optical fiber. FIG. 4C shows the bandwidth usage on unshielded twisted line pair 50 in the downstream and upstream directions.

At central office 10, coupler 135 provides the upstream user data light signal to fiber optic receiver 140 which functions to convert the signal supplied thereto from lightwave form to electrical form, and to supply the electrical signal to downconverter 145 which operates in a complementary manner to upconverter 330. The downconverted signal is supplied to demodulator 146 which operates in a complementary manner to the modulation equipment in NIU 40. The demodulated signal is supplied to video server 101 and data server 102.

In some embodiments, instead of providing a dedicated CAP channel to each home, the channels are dynamically assigned so that each transmitter 110 serves more users. For example, if 25% is the predicted peak rate on the high bandwidth service, then each transmitter 110 could serve four times, i.e., 1/0.25, as many homes as without dynamic channel assignment.

In the dynamic channel assignment embodiments, video server 101 and data server 102 supply channel allocation signals to multiplexer 106 which forms a channel allocation signal. Multiplexer 106 is coupled to transmitter 115 which forms a low bit rate signal and provides the low bit rate signal to summer 125 for transmission to users via fiber optic cable distribution plant 20.

In the dynamic channel assignment embodiments, at ONU 30, the signal from fiber optic receiver 310 is applied to controller 315 which functions to extract appropriate channel allocation information and control the operation of downconverter 320 accordingly. That is, downconverter 320 is operable in a frequency selectable manner in response to a control signal from controller 315.

In certain embodiments, telephone signals are also carried via fiber optic cable distribution plant 20.

The downstream voiceband path will now be described.

Central office 10 includes plain old telephony services (POTS) interface 150, which supplies a multiplexed voiceband signal to modulator 151 that functions to modulate the voiceband signal, for example, using QPSK modulation, and to supply the modulated signal to summer 125. It will be appreciated that multiple modulators 151 may be provided, and each modulator may accommodate multiple voiceband channels. Each voiceband channel may carry voice or data transmitted in the voiceband. Summer 125 provides the modulated voiceband signal to fiber optic transmitter 130 for transmission to users via fiber optic cable distribution plant 20. Each modulator 151 accommodates, for example, 24 voiceband channels in a 1.54 Mbps DS1 line. Although an upconverter is not shown, the modulated voiceband signals are transmitted in the frequency band above the CAP channels, such as above 800 MHz.

At ONU 30, the electrical signal from fiber optic receiver 310 is also supplied to a downconverter (not shown) and thence to demodulator 351 which functions in a complementary manner to modulator 151 to produce a demodulated signal which is applied to demultiplexer 352. It will be appreciated that POTS 150 multiplexes the voiceband channels for the users served by ONU 30, and that demultiplexer 352 functions in a complementary manner to separate the voiceband signals for these users, and to supply the separated voiceband signals to the appropriate amplifier 325 for transmission via unshielded twisted pair to NIU 40.

The upstream voiceband path will now be described.

NIU 40 is adapted to place a voiceband signal on the unshielded twisted pair connected to ONU 30. At ONU 30, the voiceband signal is supplied to multiplexer 353, along with other voiceband signals (not shown) from other users served by ONU 30. Multiplexer 353 functions to multiplex the voiceband signals and to supply a multiplexed signal to modulator 354 which modulates the multiplexed signal and applies the modulated signal to summer 335. Summer 335 is adapted to combine the modulated multiplexed voiceband signal with the upconverted upstream data signals from upconverters 330, and to supply the summed signal to fiber optic transmitter 340 for transmission to central office 10 via fiber optic cable distribution plant 20.

At central office 10, the electrical signal produced by fiber optic receiver 140 is applied to demodulator 152, which functions in a complementary manner to modulator 354 to produce a demodulated signal that is applied to POTS interface 150.

In the embodiment of FIG. 1, separation of telephony signals from the broadband CAP data is performed in ONU 30. In other embodiments, the telephony signals are included with the broadband data, and user equipment separates the telephony signals from the other data.

The embodiment of FIG. 1 is directed to provision of video on demand to each user. Additionally, broadcast video service can be provided. For example, broadcast MPEG channels can be delivered over the PON using coarse wavelength-division-multiplexing (WDM) (Reichmann, K. C. et al., "Broadcast Digital Video as a Low-Cost Overlay to Baseband Digital Switched Services on a PON", *Optical Fiber Communications Conference*, 1996, WI4, pp. 144–145). Alternatively AM-VSB channels can be provided over a separate coaxial cable distribution system which provides power to ONU 30, as in the switched digital video (SDV) system proposed by Lucent Technologies and Broadband Technologies.

While NIU 40 is shown as located at a home in FIG. 1, it could alternatively be located at an office.

The embodiment of FIG. 1 is a fiber to the curb (FTTC) system. For fiber to the home (FTTH) systems, there is no shared ONU 30, and instead, each home includes appropriate portions of the equipment otherwise provided at ONU 30. An advantage of the present technique for a FTTH system is that it enables use of unshielded twisted pair in the user premises.

Although an illustrative embodiment of the present invention, and various modifications thereof, have been described in detail herein with reference to the accompanying drawings, it is to be understood that the invention is not limited to this precise embodiment and the described modifications, and that various changes and further modifications may be effected therein by one skilled in the art without departing from the scope or spirit of the invention as defined in the appended claims.

What is claimed is:

1. A method for transmitting information from a central facility to a plurality of users, comprising the steps of:
   providing CAP signals for selected users,
   upconverting the CAP signals,
   combining the upconverted CAP signals, and
   transmitting the combined upconverted CAP signals from the central facility to the selected users.

2. The method of claim 1, wherein at least one of the CAP signals is a 16-CAP signal.

3. The method of claim 1, wherein the step of transmitting uses a fiber optic cable for at least part of the transmission path.

4. The method of claim 1, wherein the CAP signals represent information at respective data rates, at least two of the data rates being different.

5. The method of claim 1, further comprising the step of providing a channel allocation signal indicating associations between the CAP signals and the selected users.

6. The method of claim 1, wherein the step of transmitting transmits the combined upconverted CAP signals to an ONU serving multiple users.

7. The method of claim 6, wherein the ONU is operative to separate and downconvert the combined upconverted CAP signals to produce recovered CAP signals.

8. The method of claim 7, wherein the ONU is further operative to transmit the recovered CAP signals to respective selected users.

9. The method of claim 8, wherein the ONU transmits the recovered CAP signals to the selected users using respective unshielded twisted line pairs.

10. The method of claim 1, wherein the step of transmitting transmits the combined upconverted CAP signals directly to a user.

11. A system for transmitting information from a central facility to a plurality of users, comprising:
    a signal source for providing CAP signals for selected users,
    an upconverter for upconverting the CAP signals,
    a combiner for combining the upconverted CAP signals, and
    a transmitter for transmitting the combined upconverted CAP signals from the central facility to the selected users.

12. The system of claim 11, wherein at least one of the CAP signals is a 16-CAP signal.

13. The system of claim 11, wherein the transmitter is a fiber optic transmitter.

14. The system of claim 11, wherein the CAP signals represent information at respective data rates, at least two of the data rates being different.

15. The system of claim 11, further comprising means for providing a channel allocation signal indicating associations between the CAP signals and the selected users.

16. The system of claim 11, wherein the transmitter transmits the combined upconverted CAP signals directly to a user.

17. The system of claim 11, wherein the transmitter transmits the combined upconverted CAP signals to an ONU serving multiple users.

18. The system of claim 17, wherein the ONU is operative to separate and downconvert the combined upconverted CAP signals to produce recovered CAP signals.

19. The system of claim 18, wherein the ONU is further operative to transmit the recovered CAP signals to respective selected users.

20. The system of claim 19, wherein the ONU transmits the recovered CAP signals to selected users using respective unshielded twisted line pairs.

21. A method for transmitting information from a central facility to a plurality of users, comprising the steps of:
    providing signals modulated in a predetermined format for selected users,
    upconverting the signals,
    combining the upconverted signals,
    transmitting the combined upconverted signals from the central facility to an intermediate unit,
    separating the combined upconverted signals at the intermediate unit,
    downconverting the separated signals at the intermediate unit, and
    transmitting the downconverted signals modulated in the predetermined format to the selected users.

22. The method of claim 21, wherein the step of transmitting the downconverted signals to the selected users uses respective unshielded twisted line pairs.

23. The method of claim 21, wherein the step of transmitting the combined upconverted signals uses a fiber optic cable.

24. The method of claim 21, wherein the predetermined format is CAP.

25. A system for transmitting information from a central facility to a plurality of users, comprising:
    a signal source for providing signals modulated in a predetermined format for selected users,
    at least one upconverter for upconverting the signals, a combiner for combining the upconverted signals, a first transmitter for transmitting the combined upconverted signals from the central facility to an intermediate unit, and at least one downconverter for separating and downconverting the combined upconverted signals at the intermediate unit to produce downconverted signals modulated in the predetermined format for transmission to the selected users.

26. The system of claim 25, wherein the second transmitter is operative to transmit the downconverted signals to the selected users via respective unshielded twisted line pairs.

27. The system of claim 25, wherein the first transmitter uses a fiber optic cable.

28. The system of claim 25, wherein the predetermined format is CAP.

29. A method for transmitting information between a central facility and a plurality of users, comprising the steps of:

providing signals modulated in a first predetermined format for selected users at the central facility, upconverting the signals, combining the upconverted signals, transmitting the combined upconverted signals from the central facility to an intermediate unit using a fiber optic cable, separating and downconverting the combined upconverted signals at the intermediate unit, transmitting the downconverted signals modulated in the first predetermined format to the selected users using respective unshielded twisted line pairs, providing a user signal modulated in a second predetermined format from one of the users to the intermediate unit, and transmitting the user signal from the intermediate unit to the central facility using the fiber optic cable.

30. The method of claim 29, wherein the step of providing a user signal from one of the users to the intermediate unit is via one of the respective unshielded twisted line pairs.

31. The method of claim 29, wherein the step of providing a user signal from one of the users to the intermediate unit is via another unshielded twisted line pair which is other than one of the respective unshielded twisted line pairs.

32. The method of claim 29, wherein the intermediate unit is operative to upconvert the user signal and to combine the upconverted user signal with another user signal, and to transmit the combined signal to the central facility using the fiber optic cable.

33. The method of claim 29, wherein the first predetermined format is CAP.

34. The method of claim 29, further comprising the steps of providing modulated voiceband signals at the central facility and demodulating voiceband signals at the intermediate unit, and wherein the step of combining includes combining the modulated voiceband signals with the upconverted signals, and the step of transmitting the downconverted signals modulated in the first predetermined format to the selected users includes transmitting the demodulated voiceband signals.

35. The method of claim 29, further comprising the steps of providing respective voiceband signals from certain users to the intermediate unit, combining the voiceband signals at the intermediate unit, modulating the combined voiceband signals at the intermediate unit, demodulating the combined voiceband signals at the central facility, and wherein the step of transmitting the user signal from the intermediate unit to the central facility includes transmitting the combined voiceband signals.

36. A system for transmitting information between a central facility and a plurality of users, comprising:

a first signal source for providing signals modulated in a first predetermined format for selected users at the central facility, an upconverter for upconverting the signals, a combiner for combining the upconverted signals, an optical transmitter at the central facility for transmitting the combined upconverted signals to an intermediate unit using a fiber optic cable, a downconverter for separating and downconverting the combined upconverted signals at the intermediate unit to produce downconverted signals modulated in the first predetermined format for transmission to the selected users using respective unshielded twisted line pairs, a second signal source for providing a user signal modulated in a second predetermined format from one of the users to the intermediate unit, and a transmitter at the intermediate unit for transmitting the user signal to the central facility using the fiber optic cable.

37. The system of claim 36, wherein the second signal source provides the user signal to the intermediate unit via one of the respective unshielded twisted line pairs.

38. The system of claim 36, wherein the second signal source provides the user signal to the intermediate unit via another unshielded twisted line pair which is other than one of the respective unshielded twisted line pairs.

39. The system of claim 36, wherein the intermediate unit is operative to upconvert the user signal and to combine the upconverted user signal with another user signal, and to transmit the combined signal to the central facility using the fiber optic cable.

40. The system of claim 36, wherein the first predetermined format is CAP.

41. The system of claim 36, further comprising means for providing modulated voiceband signals at the central facility and a demodulator for demodulating voiceband signals at the intermediate unit, and wherein the combiner is operative to combine the modulated voiceband signals with the upconverted signals, and the second transmitter is operative to transmit the demodulated voiceband signals to the selected users.

42. The system of claim 36, further comprising means for providing respective voiceband signals from certain users to the intermediate unit, a combiner at the intermediate unit for combining the voiceband signals, a modulator at the intermediate unit for modulating the combined voiceband signals, a demodulator at the central facility for demodulating the combined voiceband signals, and wherein the transmitter at the intermediate unit is also operative to transmit the combined voiceband signals from the intermediate unit to the central facility.

* * * * *

UNITED STATES PATENT AND TRADEMARK OFFICE
CERTIFICATE OF CORRECTION

PATENT NO. : 5,822,102
DATED : October 13, 1998
INVENTOR(S) : George E. Bodeep, et. al.

It is certified that error appears in the above-identified patent and that said Letters Patent is hereby corrected as shown below:

Title page, item [73] Assignees, should read -- AT&T Corp., New York, NY 10013-2412 and Lucent Technologies, Inc., Murray Hills, NJ 07974.

Signed and Sealed this

Eighth Day of February, 2000

Attest:

Q. TODD DICKINSON

Attesting Officer

Commissioner of Patents and Trademarks